Patented Nov. 16, 1943

2,334,573

UNITED STATES PATENT OFFICE 2,334,573

FLUID COUPLING

Raymond J. Miller, Detroit, Mich., assignor to Hydraulic Brake Company, Detroit, Mich., a corporation of California Application May 31, 1941, Serial No. 396,116

1 Claim. (Cl. 60—54)

This invention relates to fluid couplings.

So far, as disclosed in the prior art, little or nothing has been accomplished in the way of reducing objectional vibrational harmonics inherent in fluid couplings because of slippage between the driving and driven elements of the unit. The present invention aims to overcome this objectional condition.

The invention comprehends a fluid coupling including an impeller, a runner for cooperation therewith, and means incorporated in the unit for inhibiting vibrational harmonics within the unit.

An object of the invention is to provide a fluid coupling including an impeller and a runner providing in conjunction with one another fluid circuits having varying numbers of blades in the respective circuits, so as to change the period of torsional vibration of the coupling.

Another object of the invention is to provide a fluid coupling including an impeller and a runner providing in conjunction therewith a plurality of fluid circuits, having a different number of blades in each circuit.

Another object of the invention is to provide a fluid coupling including an impeller and a runner providing in conjunction with one another a plurality of fluid circuits, having varying numbers of blades therein, the number of blades in one circuit not having a common factor with the number of blades in either of the other circuits.

Other objects and advantages of the invention will appear from the following description taken in connection with the drawings forming a part of this specification, and in which—

Figure 1:
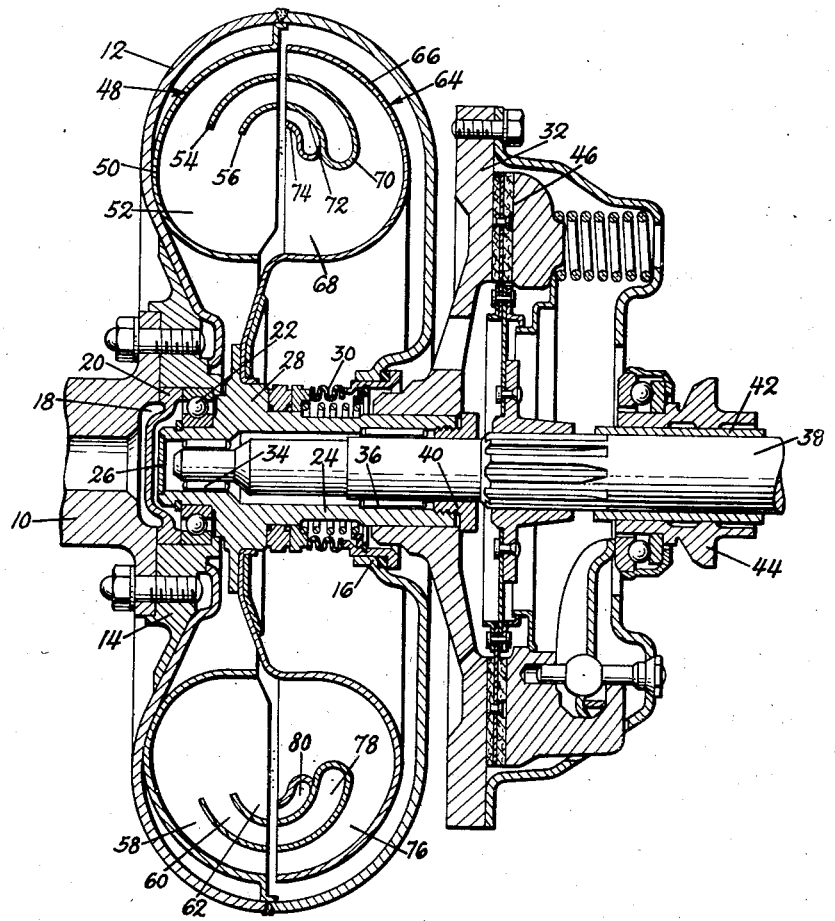
Fig. 1 is a vertical sectional view of a fluid coupling embodying the invention.
Figure 2:
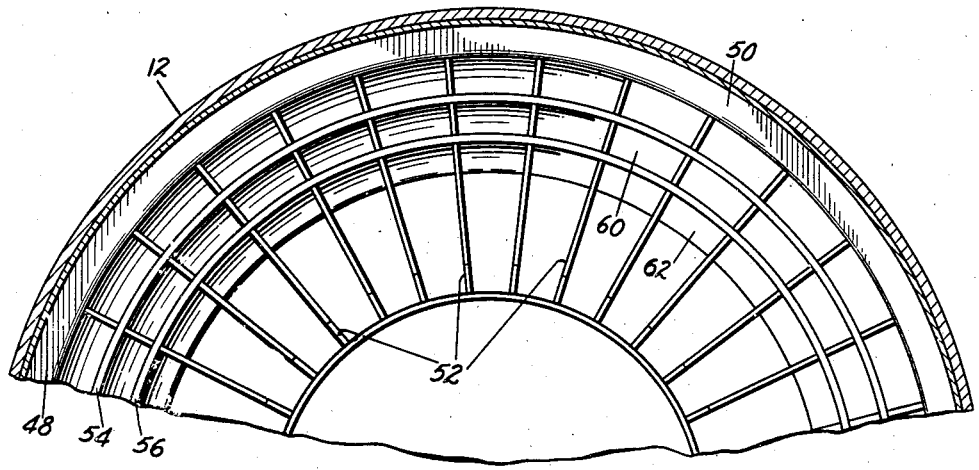
Fig. 2 is a front elevation, partly broken away, of the impeller.
Figure 3:
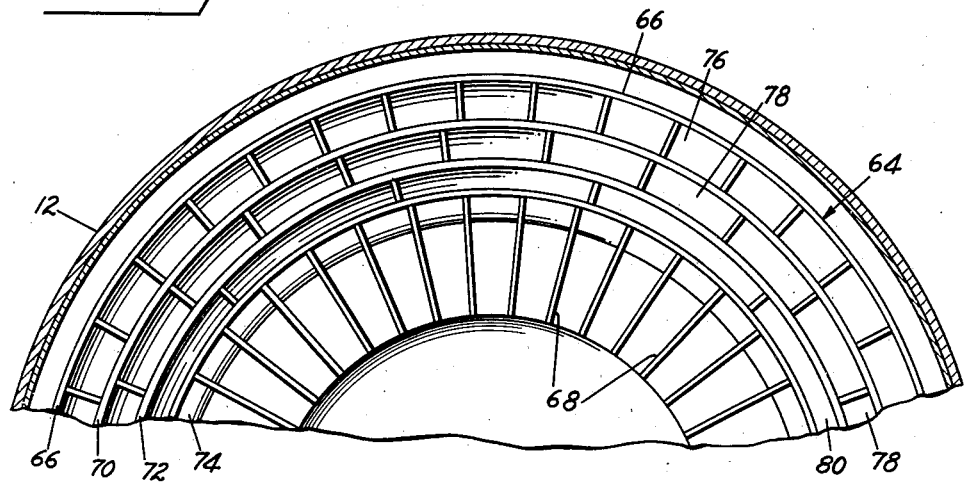
Fig. 3 is a similar view illustrating the runner.

Referring to the drawings, 10 represents a driving shaft supporting a housing 12. The housing includes a case having a concentrically disposed hub 14 suitably secured to the driving shaft, and a hub 16 oppositely disposed with relation to the hub 14. As shown, the hub 14 has an axial bore 18, and fitted in this bore is a closure plate 20 and also a bearing 22.

A sleeve 24 supported for rotation on the bearing 22 in axial alignment with the driving shaft 10 extends through the hub 16. The sleeve has one of its ends closed as by a plug 26, and positioned on the sleeve adjacent this closed end is a circumferential flange 28. A fluid seal 30 is interposed between the flange 28 and the hub 16, and a clutch member 32 is splined on the other end of the sleeve.

Pin bearings 34 and 36 arranged in the sleeve 24 in spaced relation to one another support for rotation a driven shaft 38, and a retaining ring 40 sleeved on the shaft and threaded in the sleeve serves to retain the clutch member 32 against displacement. The driven shaft extends through a bushing 42 in a bearing support 44 supported on a housing, not shown, and splined on the driven shaft for rotation therewith and for relative axial movement is a clutch member 46 for cooperation with the clutch member 32.

An impeller indicated generally at 48 includes an outer shroud 50 suitably secured to the inner wall of the housing 12, and arranged on this shroud are spaced blades 52 supporting a plurality of shrouds 54 and 56 providing separate fluid circuits 58, 60 and 62, and, correspondingly, a runner indicated generally at 64 includes a shroud 66 secured to the flange 28 on the sleeve 24, and this shroud has thereon spaced blades 68 supporting a plurality of shrouds 70, 72 and 74 providing separate fluid circuits 76, 78 and 80 registering with the fluid circuits 58, 60 and 62 of the impeller, and the circuits 78 and 80 are preferably closed at their extremities.

The structure hereinabove described provides the basis of a copending application, filed April 5, 1941, Serial No. 387,096. In fluid couplings of this and many other types, due to a differential in speed between the driving and driven members, there is slippage between the members, and this is highly desirable in certain stages of an efficient fluid coupling. However, this slip causes the introduction of undesirable vibration harmonics. This is highly objectionable, and it is the aim of the instant invention to overcome such an undesirable condition.

The instant invention contemplates the introduction of a varying number of blades in the circuits of a fluid coupling. As illustrated, the runner 64 has a plurality of fluid circuits 76, 78 and 80, and the number of blades contained in any of these circuits does not have a common factor with the number of blades contained in either of the other circuits. For example, the outer circuit 76 has therein thirty-six blades, the second or intermediate circuit 78 has therein twenty-three blades, and the inner circuit 80 has therein eleven blades. Obviously, there is no common factor of the number of blades contained in the respective circuits.

The impeller 48 has an outer circuit 58, a second or intermediate circuit 60, and an inner circuit 62, and in each of these circuits there are thirty-one blades. From this it will be clear that it is impossible to have at any period of a cycle more than one blade of the impeller in line with one blade of any one of the circuits of the runner, and that all of the remaining blades of the impeller and the runner are working out of phase. It is also clear that by such an arrangement of the blades on an impeller and in the respective circuits of the runner all undesirable harmonic phasing within the unit is avoided.

This advantage may be carried still further by extending the shrouds 54 and 56 on the impeller so as to correspondingly extend the circuits 58, 60 and 62 provided by these shrouds and introducing into the respective circuits varying numbers of blades as in the runner but differing as to the number of blades employed in the respective circuits of the impeller. For example, the outer circuit 58 may have therein thirty-one blades, the second or intermediate circuit 60 may have therein nineteen blades, and the inner circuit 62 may have therein nine blades. Here it is again apparent that there is no common factor between the blades of the respective circuits of the impeller and the runner, and thus no introduction of objectionable vibration harmonics due to slippage between the impeller and the runner, since the harmonic cycle would be spread to the extent of the multiplication of these numbers of blades, one to the other.

In a normal operation, assuming that the housing 12 is filled with fluid to a predetermined degree of its capacity, upon initial rotation of the housing the fluid in the housing is energized by the impeller 48 and by centrifugal force as a resultant of rotation of the coupling. These forces cause movement of the fluid in the circuits into the runner 64, where the energy of the fluid is received by the blades 68 of the runner, causing rotation of the runner, and because of the particular arrangement of the blades in the circuits 58, 60 and 62 of the impeller and of the blades in the circuits 76, 78 and 80 of the runner, the possibility of vibrational harmonics due to slippage between the impeller and the runner is avoided.

While this invention has been described in connection with certain specific embodiments, the principle involved is susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

In a fluid coupling, a bladed impeller, a bladed runner opposed thereto and providing in conjunction therewith several fluid circuits, one within the other, the successive inner circuits on the runner having a lesser number of blades than the next preceding and an unequal number of blades on the impeller than in any circuit of the runner, whereby the period of torsional vibration of the coupling is progressively changed from the outermost to the innermost circuit.

RAYMOND J. MILLER.